US006191783B1

(12) United States Patent
Lambourne et al.

(10) Patent No.: US 6,191,783 B1
(45) Date of Patent: *Feb. 20, 2001

(54) METHOD AND DEVICE FOR CONFIGURING A MULTIMEDIA MESSAGE FOR PRESENTATION

(75) Inventors: Robert A. Lambourne; Mieko Kusano; Andreas H. E. Lamers, all of Eindhoven (NL)

(73) Assignee: U.S. Philips Corp., New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/348,957

(22) Filed: Jul. 7, 1999

Related U.S. Application Data

(63) Continuation of application No. 08/972,975, filed on Nov. 19, 1997, now Pat. No. 5,995,093.

(30) Foreign Application Priority Data

Dec. 6, 1996 (EP) .................................................. 96203400

(51) Int. Cl.[7] ............................... G06F 13/00; G06F 3/00
(52) U.S. Cl. ........................................... 345/327; 345/302
(58) Field of Search .................................... 345/327, 333, 345/334, 335, 348–354, 302

(56) References Cited

U.S. PATENT DOCUMENTS

| 5,517,652 | 5/1996 | Miyamoto et al. .................. 395/800 |
| 5,630,060 | 5/1997 | Tang ................................. 395/200.01 |
| 5,892,507 | * 4/1999 | Moorby et al. ....................... 345/302 |

FOREIGN PATENT DOCUMENTS

| 0697655A2 | 8/1995 | (EP) ................................. G06F/9/46 |
| 0788065A2 | 5/1996 | (EP) ............................... G06F/17/30 |

OTHER PUBLICATIONS

Robert Cowart, Mastering Windows 3.1, Special Edition, Sybex Inc. 1993, pp. 84, 91, 527.*

Seh–Joon Dokko et al, "Development of Multimedia E–Mail System Providing An Integrated Message View", vol. 1997 IEEE pp. 494–498.

Conference on Telecommunications, vol. 1993, Alan Kuresevic et al., The Multimedia Mail User Agent. pp. 157–164.

* cited by examiner

Primary Examiner—Thomas G. Black
Assistant Examiner—Uyen Le
(74) Attorney, Agent, or Firm—Gregory L. Thorne

(57) ABSTRACT

A multimedia message is formatted for presentation. First a formatted choice menu is presented for various multimedia categories in parallel. Upon one or more user selections in series, to each selection a monomedium item space is offered for enabling to enter an item for to the associated monomedium into that space. After termination of all selections, the message is formatted for transfer. In particular, the choice menu has various selector spots, each associated to a respective monomedium. After entering a particular user item into the associated space, a symbolizer of that item is displayed at a predetermined position next to any remaining selector spot in the menu.

4 Claims, 5 Drawing Sheets

METHOD AND DEVICE FOR CONFIGURING A MULTIMEDIA MESSAGE FOR PRESENTATION

CROSS REFERENCE TO RELATED APPLICATIONS

This is a continuation of application Ser. No. 08/972,975, filed Nov. 19, 1997, now U.S. Pat. No. 5,995,093.

BACKGROUND TO THE INVENTION

The invention relates to a method for configuring a multimedia message for presentation to a non-local destination, said method comprising the steps of:
  presenting a formatted choice menu for various multimedia categories in parallel,
  upon one or more user selections in series, offering to each such user selection a monomedium item space for enabling the user to enter an item pertaining to the associated monomedium into said space,
  and after termination of all selections formatting the message for transfer.

The technology of composing of multimedia messages has been under discussion for some time. Various monomedia distinguish from each other in that either the transfer channels, or the rendering channels, or both, are distinguished in from each other. The distinction may be audio versus video or mixed. The distinction may reside in widely different bitrates. The embodiment hereinafter considers four such distinct monomedia:
  text in the form of characters, that each have an individual character identity, and collectively may be formed according to some letter type or font; here the rendering is visual, and the code is ASCII or the like
  human or similar speech, or other sound, that is represented as coded sound; the rendering is audio, and the representation may be various, varying from LPC (linear predictive code) to CD-quality
  photographs or other images represented by a coded picture; various compaction standards have been defined
  movie represented by a sequence of coded pictures, that may or may not be accompanied by sound; this sound may be coded in another manner than the earlier one.

In principle, the number of the above channels may be chosen greater or smaller, either on the system or on the message level. Smaller, in that one or more of the above may be considered irrelevant or too expensive. Greater, in that additional channels may be considered. A further feasible channel is for example formed by handwriting or by a hand-drawn Figure, that is represented by a string of vectors. In an interactive context, various other categories could be thought of.

Now, the inventors have recognized that the inexperienced user should be guided by a right amount of cues and indications for making the composing of a message a transparent art: the invention is not directed to professional data processing technologists. In particular, such user should readily grasp how far the composing of a particular multimedia message has proceeded without necessitating the replay of the full composition. Note that the latter may offer a problem, when the message contains static, as well as dynamic items: such replay could require several minutes.

SUMMARY TO THE INVENTION

Therefore, amongst other things it is an object of the present invention to visually indicate to a user person which items have been inserted into the message already, and also to some extent, the character or nature of such items. Now according to one of its aspects, the invention is characterized in that by providing in said formatted choice menu various selector spots, each associated to a respective monomedium, and after said entering of a particular user item into the associated space, displaying a symbolizer of that item at a predetermined position next to any remaining selector spot in the menu. Through the visual presentation, the user has a fuller idea of the "to-do" versus "done" character of the various parts of a message to be composed, and moreover, will even during the configuring, be inspired to proceed. For example, the showing of a snapshot photograph at a former selector spot or "hotspot", may easily bring about new associations for introducing into a textual message. The symbolizers may relate to the content of the associated item in the way of an excerpt, but this is not always feasible or optimum. Their positions may correspond to the position of the hotspot used for entering to the associated monomedium selection, but they may alternatively be, for example, positioned in a row according to seniority.

Advantageously said formatting as being selectably in any of a plurality of predetermined styles that are defined in the form of a respective template. This further supports the non-professional user in easily finding an appropriate message format. Alternatively, the user may be offered a choice for freely composing the succession of the various items in the message and their presentations to the receiver.

The invention also relates to a device for practising the method. Further advantageous aspects of the invention are recited in dependent Claims.

BRIEF DESCRIPTION OF THE DRAWING

These and further aspects and advantages of the invention will be discussed more in detail hereinafter with reference to the disclosure of the preferred embodiments, and particularly with reference to the appended Figures that show.

DETAILED DESCRIPTION OF PREFERRED EMBODIMENTS

Figure 1:
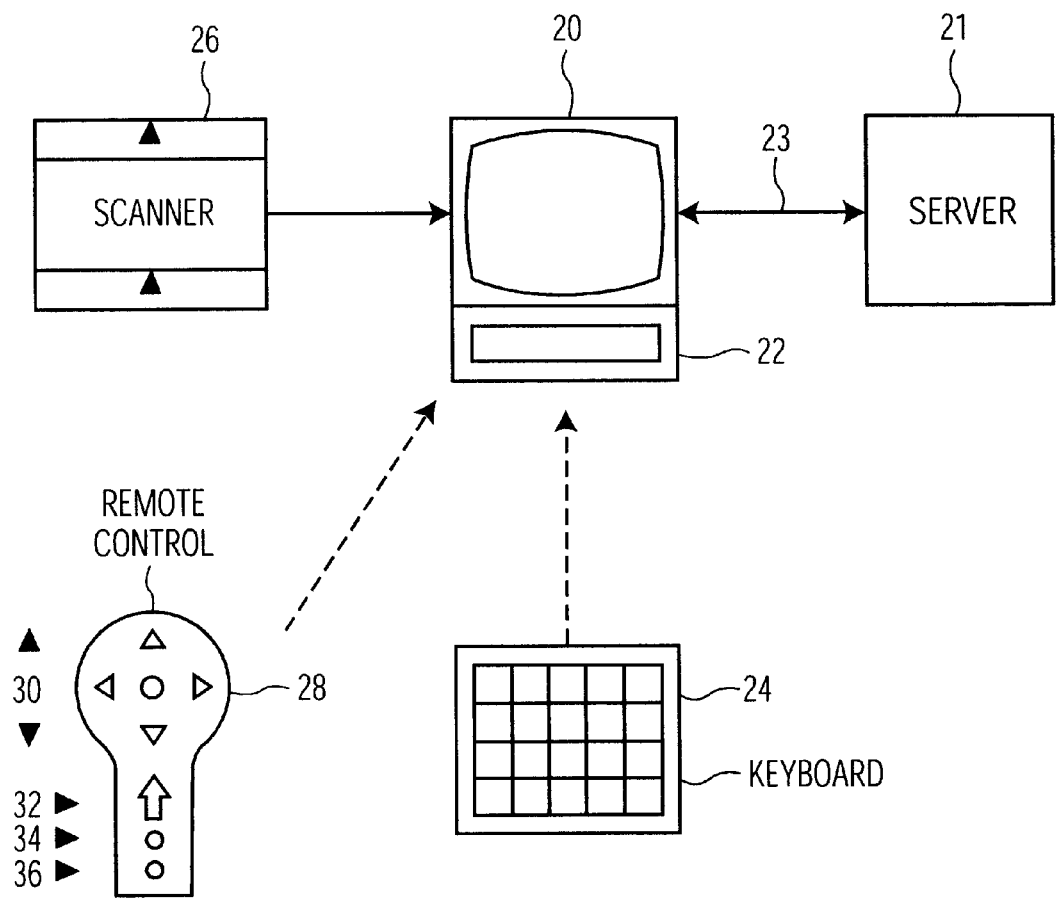
FIG. 1, a block diagram of a device according to the invention.

FIG. 1 is a block diagram of a device according to the invention. The setup centers around the common household television set 20 that has been provided with onboard or separate video recorder 22. The technology of both television and recorder may be present-day, as well as advanced. In one embodiment, the television set comprises enough on-board storage to hold the program necessary to practice the invention. In another embodiment, the program may sit on a separate server device 21. One envisaged realisation is to interconnect the server via Internet 23; Internet may then also be used for transmitting the letter itself. Control is by remote control device 28 that has two-dimensional cursoring control 30 provided with central OK button. Further controls are 32 for home, 34 for goto TV, and 36 for goto message environment. By itself, remote control technology is standard. Wireless keyboard 24 allows for text input; this need not attain full querty functionality. Alternatively, the keyboard may be located on-screen. The home selection has been indicated in FIG. 2 by capital H.

Figure 2:
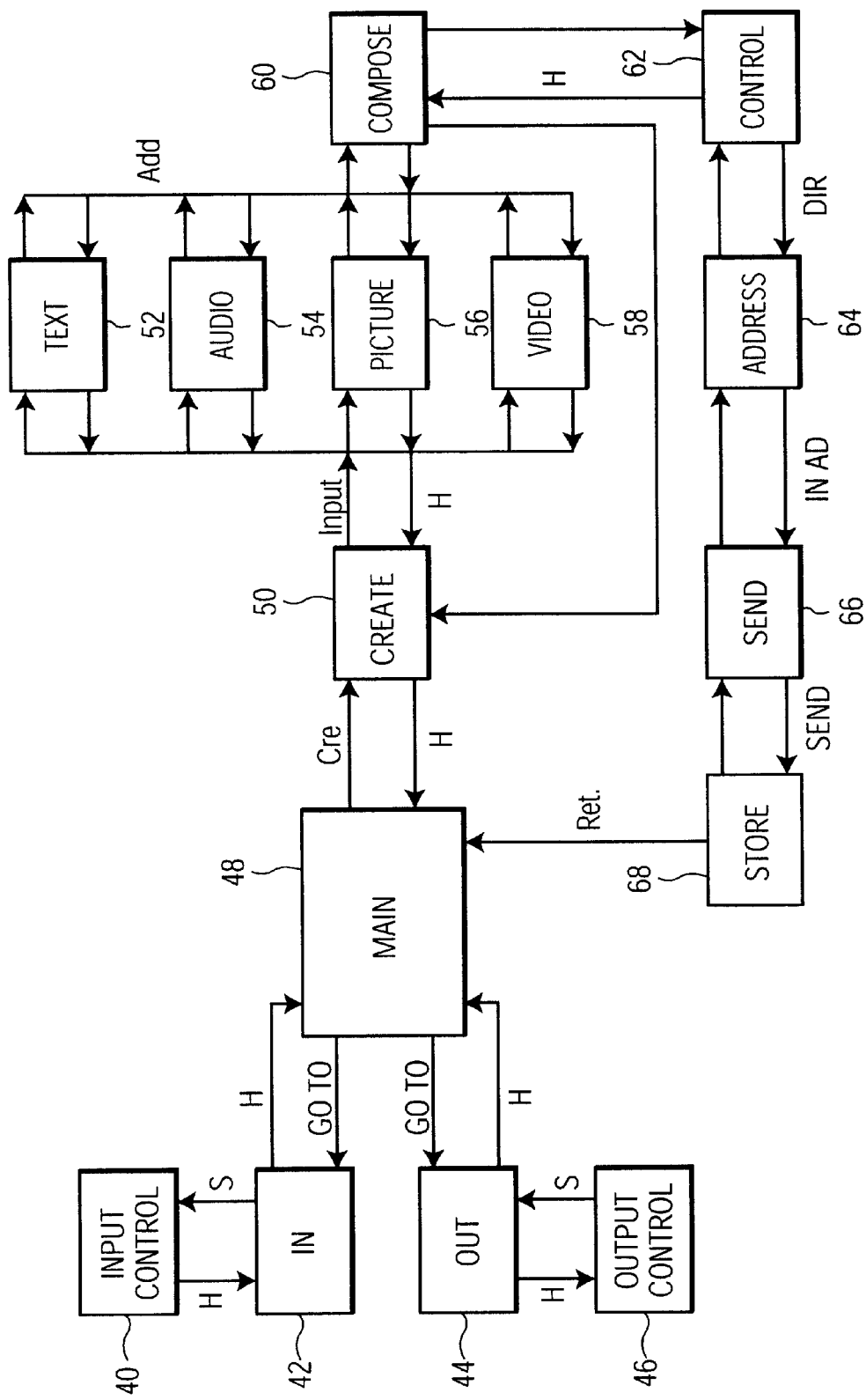
FIG. 2, a navigation diagram.

FIG. 2 is a navigation diagram. The overall facility starts from main screen 48. This offers selecting among inbox, outbox and create. Selecting is always by hotspots such as will be shown with reference to FIGS. 3A–3F hereinafter. Actuating Create transfers to create screen 50. This offers selecting among text, audio, picture, video. Selecting transfers to any of screens 52, 54, 56, 58 that pertain to the four selections, respectively. The content items can sourced by an appropriate storage mechanism, such as the VCR that may accommodate stills and sound, by a live source, such as camera or microphone not shown, scanner 26 for pictures or keyboard 24 for text. Screen 52 allows selecting add to letter and delete. Screen 54 additionally to screen 52 allows selecting record, stop and play. Screen 56 additionally allows selecting rotate, darken, and lighten. Screen 58 additionally allows selecting record, stop and play. Navigation along screens 52–58 may proceed as found necessary. After all necessary items have been entered into the message data structure, compose screen 60 may be selected through add to letter. In particular, screen 60 shows locations that may but not need to correspond to the hotspot configuration of screen 50, and which now also feature the items entered into the message structure through an associated symbolizer of the user item in question. For example, if a picture, a cutout of the picture is shown. If text, the initial few lines of the text in question are shown, or just a fraction thereof, such as the letterhead. If a movie, a frame thereof is shown. If sound, an audio wave pattern is shown. This means that the user knows where items have already been entered already, and which possibilities have yet been left unused. After adding an item to the letter, the associated symbolizer is directly displayed in screen 60. This means that the screen as shown is only attained after entering all four categories. The transmitting of a message is possible after an arbitrary number of user items has been entered. In a simple version, each category may be entered only once. In a more elaborate version, the user may reselect a particular monomedium more than once. This could mean either that the displayed excerpt still retains its hotspot character, or that a special repeat hotspot would be present.

Screen 60 allows selecting between a plurality of styles, each style being defined in the form of a respective template. Appropriate style may be formal for a business letter, classic for a standard letter, congratulatory, hilarious or other. The inventors have considered the following embodiments:

a. Classic template: first text and picture are displayed side-by-side; next the video is played; finally the sound is played while again displaying the picture.

b. Congratulatory template: first the sound is played together with the picture, next the text is displayed, finally, the video is played c. So-called wild template: first the picture is displayed together with dynamic text of which various paragraphs are shown one after the other; next, the video is displayed; finally, the sound is played while again displaying the picture.

For certain styles, the system may prompt the user to complete particular monomedia items of the message; this has not been shown for brevity. In an elementary version, the video may be omitted as requiring too much bandwidth.

The general nature of the format may be preprogrammed in the system, for example, in that for a congratulatory message various standard melodies can be selected, such as Happy Birthday, Wedding March, and so on. Also, various standard pictures or vignettes can be offered by the system to the user, either as basic features, or through loading of some auxiliary medium such as a floppy disk, into the recorder. Selecting the style transfers to screen 62. This allows selecting play, stop, and addressing, as well as to return to screen 60 for selecting another style. If the user wants to send it, screen 64 allows selecting in an address directory or typing of an appropriate address. After addressing, screen 66 allows effectively sending the message to addressee. After sending, screen 68 allows saving or not saving the message. In both cases, the system reverts to main screen 48. Sending the same message to a series of addresses is done by returning to screen 64. After sending, the message is saved in the outbox.

The outbox is represented by screen 44. This allows selecting the sent messages in a list. If selected, the message may be viewed or played through selecting from screen 46. The subject of a particular message is entered at the same time as the addressing in box 64. Screen 46 allows selecting to play, or to stop the message. Similarly, screen 42 allows displaying the outbox list, whilst screen 40 allows selecting and playing of any received messages. For brevity, the actual receiving of messages sent by other persons, the clearing of the mailboxes, and various other utilities have not been discussed, inasmuch as the invention centers on the actual configuring of the messages.

Figure 3A:
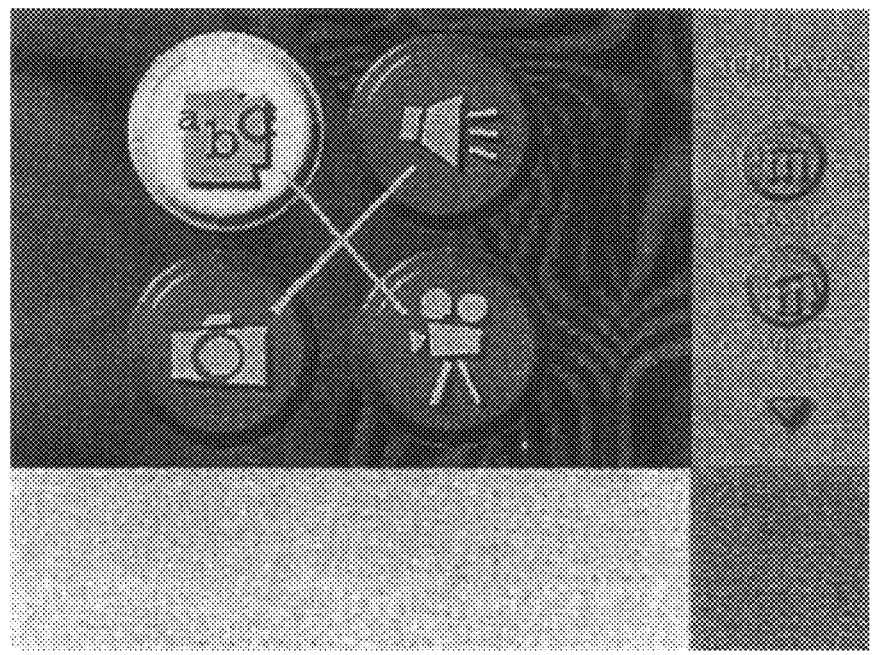
FIGS. 3A–3F, various frames that are displayed during the use of the invention.

FIGS. 3A–3F depict various frames displayed during the use of the invention. FIG. 3A is the CREATE screen. In the large field, the four selector spots relate to the text item, the sound item, the picture item, and the video item, respectively, as indicated by associated fixed icon-like elements; as shown by highlighting, first the text should be chosen. However, in another embodiment the sequence of entering the four monomedia items is arbitrary. The top right field has two icons that represent the classic and wild style, respectively, but which are not highlighted. Directly below is a further non-highlighted, and therefore, passive element. The other two fields are empty.

Figure 3B:
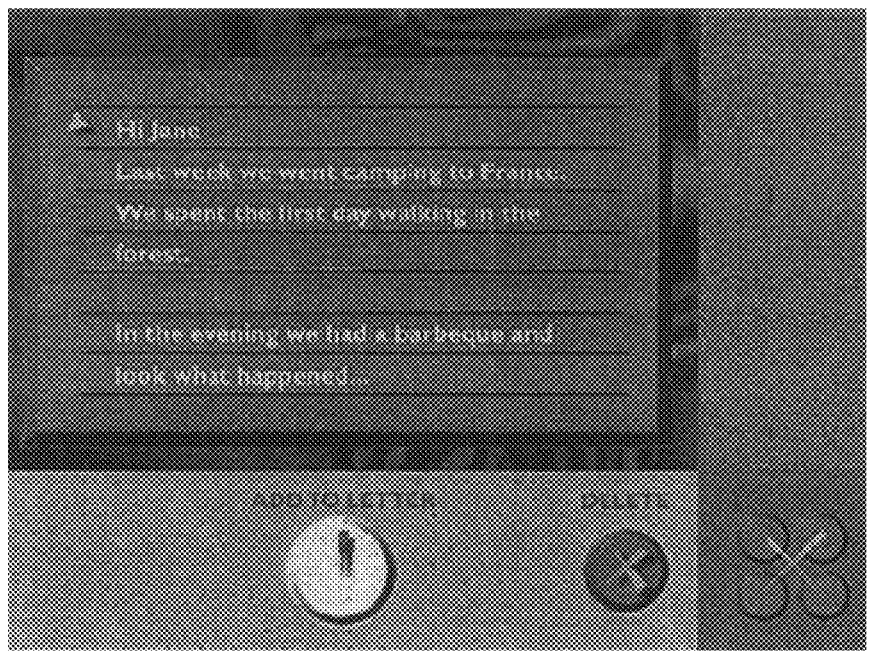

FIG. 3B allows to compose the text, which is displayed in the big field. The text may be restricted so as to fit in this field, or alternatively be allowed to overflow this field. The top right field is empty. The lower field has icons for add-to-letter and for delete. The lower right field allows to go back to create.

Figure 3C:
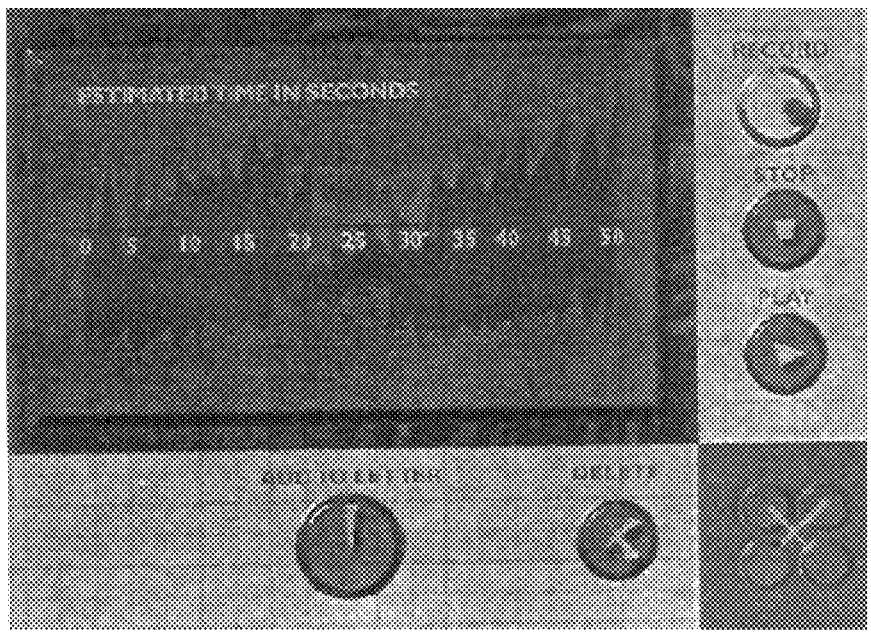

FIG. 3C allows to enter sound. The big field shows an amplitude characteristic of the sound while played. The right hand field has record, stop, and play icons. The lower two fields have the same icons as the preceding Figure.

Figure 3D:
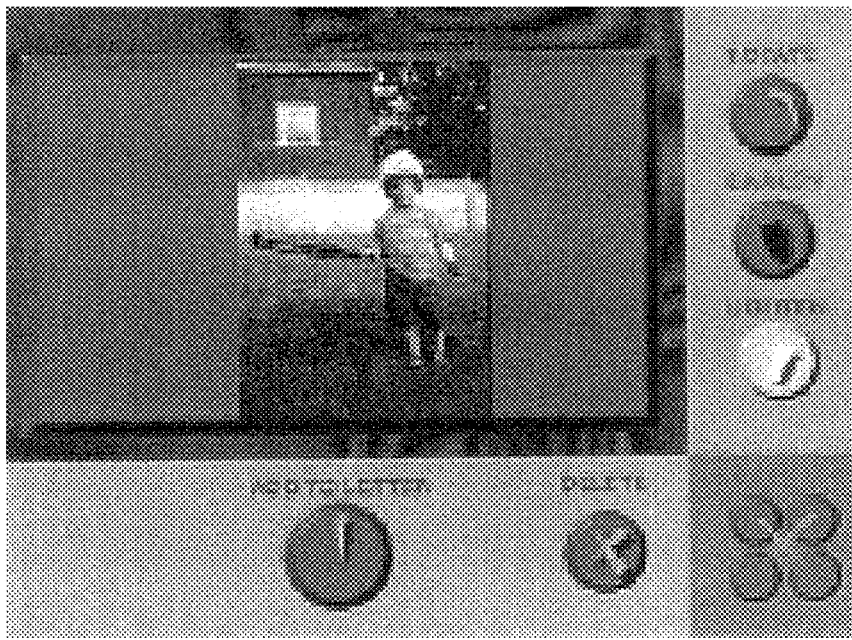
Figure 3E:
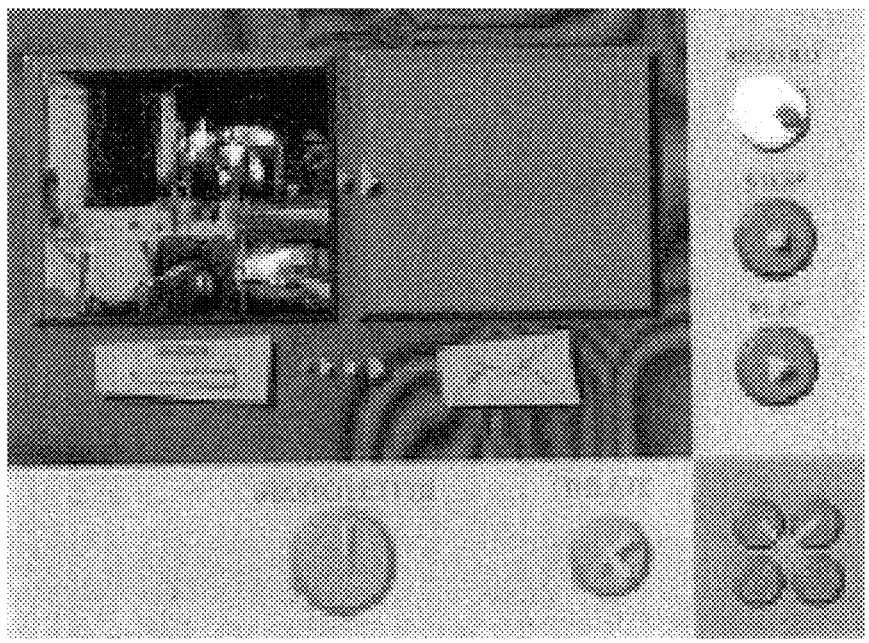
Figure 3F:
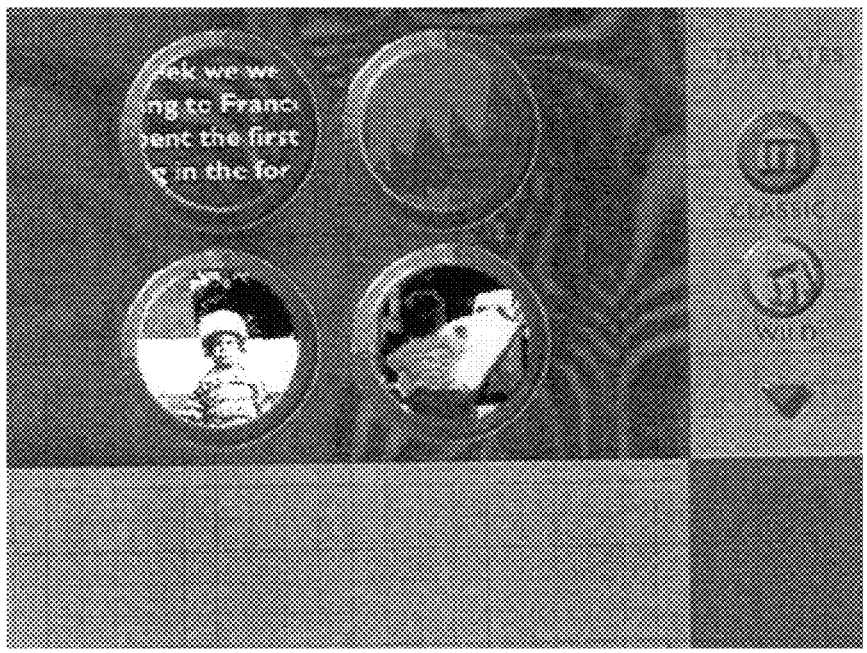

FIG. 3D allows to enter a picture. The big field has a picture for inclusion in the message. The right hand field has icons for rotate, darken, and lighten. The lower two fields have the same icons as the preceding Figure. FIG. 3E allows to enter video. This Figure has the same set of icons as FIG. 3C. As this screen is generally the last to occur in message composing, it has at the bottom of its big field an icon that symbolizes the actual transmitting of the message. Going back to Screen 50 generally means cancel. Going to screen 60 generally means adding one more multimedia item, of which the associated excerpt then is displayed in lieu of the selector spot.

What is claimed is:

1. A graphical user interface comprising a plurality of displayed icons, each one representing a type of monomedium input option, wherein, after a user selects a particular icon and enters a corresponding monomedium input, the display of that icon is altered to an icon representation of an excerpt of the monomedium input entered by the user.

2. The interface of claim 1, wherein the input option is a button display.

3. The interface of claim 1, wherein the interface is for assisting the user to create a multimedia message, and the option is for adding a given type of content to the message.

4. A graphical user interface comprising a plurality of displayed icons representing option selection effectors for generating a multimedia message, each said effector symbolizing a type of monomedium input, wherein after a user enters a monomedium input symbolized by a particular one of the effectors, the display of that effector is automatically changed from a generalized symbol to an icon representation of an excerpt of the entered monomedium input symbolized by that effector.

* * * * *